Patented Mar. 14, 1950

2,500,842

UNITED STATES PATENT OFFICE 2,500,842

AMINOTRIAZINE-ORGANOSILICON COMPOSITION

Charles A. MacKenzie, Upper Montclair, and John B. Rust, West Orange, N. J., assignors, by direct and mesne assignments, of one-half to Montclair Research Corporation, a corporation of New Jersey, and one-half to Ellis-Foster Company, a corporation of New Jersey No Drawing. Application February 8, 1944, Serial No. 521,570

17 Claims. (Cl. 260—45.2)

This invention relates to compositions containing organo-silicon derivatives modified by amino ring compounds, to lacquers and molding compositions containing such compositions, to articles carrying lacquer coatings of such compositions, to molded articles produced therefrom, and to methods of making such compositions and articles.

Melamine-aldehyde resins which comprise a part of the general class of amino triazine-aldehyde resins, have been employed in baking lacquers of excellent hardness, gloss and chemical resistance. These resins have also been blended with other types of resins such as alkyd resins, phenol-aldehyde resins, polyvinyl resins, polystyrene resins, polyacrylates and the like to give blended resins having varying degrees of hardness, heat resistance, color retention and the like.

Among the objects of the present invention is the production of compositions utilizable for various purposes, which compositions contain organo-silicon derivatives modified by added ingredients to given new properties to the resulting compositions such as in the provision of durable, hard, clear baking lacquers.

Further objects includes the production of plasticized organo-silicon derivatives utilizable for various purposes, as in the production of high heat resistant lacquers possessing excellent electrical properties.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with the present invention it has been found that novel compositions utilizable for a variety of purposes may be produced from carbon-silicon bonded derivatives or organo-silicon derivatives when compounded with amino ring compounds selected from the group consisting of amino triazines, polyamino triazines, amino triazols, polyamino triazols, amino diazines, polyamino diazines, amino diazols, polyamino diazols, and mixtures thereof.

It has been found that the organo-silicon derivatives need not in themselves be resinifying for utilization in accordance with the present invention, but desirably such organo-silicon derivatives should contain a reactive grouping capable of combining with a methylol amino-triazine and the like. Thus it has been found that unlike urea derivatives which have restricted compatibility with organo-silicon derivatives, the blends with the amino ring compounds as set forth above and particularly the aminotriazine aldehyde resins, specifically melamine-formaldehyde resins, are compatible in all proportions ranging from small amounts of the triazine resin, for example, in the organo-silicon resins, to small amounts of organo-silicon compound in the triazine resins.

Thus baking lacquers of improved characteristics as to color retention, heat resistance, chemical resistance, gloss, electrical properties, and the like, may be made with aminotriazine-aldehyde types of resins and other derivatives as set forth above and carbon-silicon bonded derivatives such as alkyl silicon hydroxides, alkyl silicon acylates, and alkyl alkoxy silicons.

The organo-silicon derivatives utilized in accordance with the present invention may generally be represented by the formula

$$(R)_x-Si-(OR_1)_{4-x}$$

where $x$ is an integer or fraction less than four, and where R is an alkyl, aryl, alkaryl, alphyl, olifinyl, alkenyl, alkynyl, aralkenyl, cycloaryl, and the like, and $R_1$ may be any of the above stated groups as well as hydrogen, and also $R_2CO-$ where $R_2$ may be any of the above stated groups as well as hydrogen.

These organo-silicon derivatives include for example, methyl silicon hydroxides, ethyl silicon hydroxides, propyl silicon hydroxides, butyl silicon hydroxides, amyl silicon hydroxides, mixed alkyl silicon hydroxides, methyl methane orthosiliconate, ethyl methane orthosiliconate, ethyl ethane orthosiliconate, ethyl propane orthosiliconate, ethyl butane orthosiliconates, ethyl pentane orthosiliconate, ethyl silicon acetates, methyl silicon acetates, butyl silicon acetates, ethyl silicon propionates, phenyl silicon benzoates, and the like, as well as mixed organo-silicons, such as the alkyl silicon derivatives referred to, and also the organo-silicon derivatives derived from disilicon hexahalides, silicon oxyhalides, polysilicon polyhalides, and the like, any of these compounds and derivatives being produced by any desired methods.

Thus the silicon derivatives may be made by methods utilizing Grignard reagents or in any desired way.

For example, mixed alkyl silicon hydroxides may be utilized since by the use of mixed alkyl derivatives, the properties of a given alkyl silicon oxide may be modified in a given direction to enhance utility for particular purposes. For example, certain hard, brittle methyl derivatives may be modified by including some of the butyl derivative to give a product having increased flexibility. Or minor amounts of cetyl derivatives may be incorporated with the methyl to bring about an internal plasticization. Thus the control of flexibility or plasticity of any given alkyl derivatives may be obtained by the presence of a different alkyl derivative enhancing the particular property desired and this is particularly important in connection with control of properties like flexibility and plasticity. The use of alkyl derivatives containing at least three carbon atoms in the alkyl group is particularly important in thus modifying the desired characteristics of the compounds or compositions and most desirably, therefore, with alkyl derivatives containing methyl or ethyl groups, there is desirably employed alkyl groups containing three or more carbon atoms such as propyl, butyl, etc., where it is desired to use such mixed alkyl derivatives.

Such mixed derivatives may be made by the use of mixed alkyl magnesium halides reacted with silicon tetrachloride or other analogous silicon derivatives, followed by hydrolysis and dehydration. Or the alkyl silicon hydroxides may be produced separately and mixed in desired proportions before dehydration. Any means for making the mixed-alkyl derivatives may be employed. Similarly, alkyl silicon derivatives and other related compounds may be produced from disilicon hexahalides, silicon oxyhalides, polysilicon polyhalides and the like, by appropriate reactions.

Other types of organo-silicon derivatives include siliconols which have been acylated, as by conversion into esters, either in the treatment of the silicon-ols as such or in dehydrated or partially polymerized condition and either utilized as such or converted into polymeric substances as by the application of heat or catalysts, particularly using acid or basic substances, or by combination of such methods. Such esters may be produced in the pure state or they may be made partially polymeric esters. In the pure state they may take the configuration given in the following formula

$$R-Si\equiv(OOCR_1)_3$$

while the esterified polymer may have the configuration

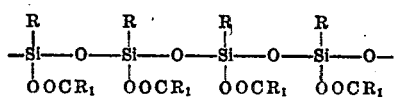

in which formulas R and $R_1$ may be the same or different organic substituents, particularly alphyls such as alkyl, unsaturated aliphatic, aryl, aralkyl, or cycloaryl groups including methyl, ethyl, propyl, isopropyl, butyl, isobutyl, amyl, hexyl, heptyl, octyl, vinyl, allyl, butenyl, cyclohexyl, propargyl, phenyl, tolyl, xenyl, and substituted alphyl groups such as chlorpropyl and chlorphenyl. Such esters include acetates which cure or polymerize by the elimination of acid anhydride, such as acetic anhydride, etc. The production of such acylates may desirably be carried out in the presence of pyridine or other tertiary amines such as quinoline, alpha picoline, dimethyl benzyl amine, dimethyl aniline, trimethyl-, triethyl-, etc. amine, ethyl morpholine, and the like utilized in the preparation of such acylates from the alkyl silicon-ols in the presence of acid chlorides. Besides acetic acid, other exemplary acylating agents include other acids such as stearoyl chloride, maleic anhydride, chlorpropionyl chloride, phthalic anhydride, benzoyl chloride, etc. Among solvents that may particularly be used desirably with such acylates there are included hexane, xylene, etc.

Among methods that are utilizable in producing the organo-silicon derivatives, in lieu of utilizing Grignard reagents as one of the reacting opponents, such derivatives may be produced upon reaction of an organic halide such as alkyl or aryl halide with the corresponding silicon compound such as a silicon halide in the presence of magnesium metal to form corresponding silicon derivatives which heretofore were made only by two-step Grignard reactions. The products produced by such one-stage reactions are usually complex mixtures and in some cases at least differ substantially from the reaction products obtained by utilizing the same corresponding ingredients in two-step Grignard reactions. Such products produced by the one-stage reaction utilizing either magnesium or lithium in carrying out the reaction, may be hydrolyzed and heat treated to be converted into hard tough, plastic materials or the hydrolytic products may be dissolved in suitable solvents. The reaction may be carried out in the presence of aliphatic ethers as solvents or in other ways and may also be carried out in the absence of any solvent for the reacting ingredients. The reactions in the presence of the magnesium or lithium may be carried out without first forming any Grignard reagent at all in the reacting mixture, or a small portion of Grignard or related compound may be present and formed from the reacting components in part, before the main body of the reacting components are utilized.

Among solvents that may be utilized in connection with such organo-silicon derivatives there are included hydrocarbon solvents such as aliphatic and aromatic compounds, such as hexane, benzene, toluene, etc.; ethers such as dimethyl, diethyl, diisopropyl, dibutyl ethers or mixed ethers; esters such as ethyl, butyl or amyl acetates; alcohols, etc. The alcoholic solvents include both the aliphatic alcohols such as methanol, propanol, butanol, phenols such as phenol, cycloaromatic or alicyclic alcohols such as cyclohexanol, and the like. Heat treatment of the organo-silicon derivatives in the presence of such hydroxy compounds results in producing ether type derivatives.

The amino ring compounds are illustrated by aminotriazines such as melamine, ammeline, melam, melon and the like, or mixture of aminotriazines, or polyaminotriazines, or aminotriazoles, polyaminotriazoles, aminodiazines, polyaminodiazines, aminodiazoles, polyaminodiazoles, and such amine containing ring compounds may be utilized either as individual compounds, or in various admixtures thereof, either between themselves, or in mixture with other compounds, such as a urea compound including urea and its derivatives such as thiourea, biuret, dicyandiamide, guanidine, biguanide and the like.

The compositions of the present invention are particularly produced by utilizing the desired organo-silicon derivatives with the amino ring compound, preferably blending the materials by means of a solvent, the compositions being utilized either retaining the solvent therein, or after removal of the solvent following the blending operation, depending on the utilization to which the composition is to be put. Thus lacquers may be readily produced and may be ground and formulated in any acceptable manner. Such lacquers may be compounded with any desired pigment, lake or dye. They may be applied to desired articles of manufacture to produce lacquer coatings thereon following drying operations for removal of any solvents present, to produce coatings of novel properties as illustrated in the examples set forth below.

These compositions also may be utilized in the preparation of molding compositions. They may be mixed with fillers either in the presence of the solvents or after removal of the solvents. Where the solvents are retained in preparing such molding compositions, they may be subsequently removed and the dried material molded under heat and pressure. In this manner clear resinous compositions containing for instance solely an aminotriazine formaldehyde type resin and an organo-silicon derivative may be made where no fillers are present, or molded products produced from combinations of these ingredients may be readily produced.

The composition of the present invention particularly the composite resins may be used as lacquer materials or in air drying varnishes, or they may be mixed with fillers as indicated, and molded under heat and pressure. They may be blended with other resins such as phenol-aldehyde resins, urea resins, aniline-aldehyde resins, actone-formaldehyde resins, alkyd resins, cumarone resins, vinyl resins, styrene resins, acrylate resins including polybasic esters of acrylic and methacrylic acid, diallyl maleate, allyl esters of polybasic acids and the like.

The following examples are given to illustrate the process of the present invention and the products obtainable therefrom. All proportions are in parts by weight.

*Example 1.*—A melamine-formaldehyde resin solution in amyl alcohol was made by mixing 63 parts of melamine, 203 parts of 37% formaldehyde solution, 250 parts of n-amyl alcohol and 100 parts of methanol. The solution was refluxed for 3 hours, then the water and methanol distilled off. More amyl alcohol was added and the final solution made up to 31% solids. Ten parts of the above solution was mixed with 50 parts of n-amyl alcohol and 4 parts of methyl silicon hydroxides prepared as follows: 2 parts of methyl iodide and 6 parts of magnesium turnings were placed in 108 parts of ethyl ether. After a reaction had started and was proceeding at a moderate rate, a mixture of 51.1 parts of methyl iodide and 42.5 parts of silicon tetrachloride (molar ratio of methyl iodide to silicon tetrachloride 1.5 to 1) was added slowly, with stirring, over a period of 1 hour. The mixture was then heated on a hot water bath for 1 hour, cooled and poured on ice. The ether layer was washed with water to remove hydrogen chloride. After evaporation of the ether, a viscous liquid was obtained. After the above methyl silicon hydroxide was blended with the melamine-formaldehyde resin, the excess amyl alcohol was slowly distilled off along with some water through a column for about 1 hour. The final solution was concentrated to about 33% solids. A film of the resulting lacquer was baked at 140° C. for 1½ hours. A very hard, clear, tough coating was obtained.

*Example 2.*—Three parts of n-amyl silicon hydroxide prepared by the hydrolysis of the reaction product obtained in a one-step process from amyl bromide and silicon tetrachloride in a molecular ratio of 1:1 was mixed with 10 parts of the 31% melamine-formaldehyde solution described in Example 1. Fifty parts of n-amyl alcohol was added and the mixture heated. Forty parts of n-amyl alcohol and some water were taken off through a column in 1 hour of distillation. A film of the clear lacquer solution was cast and baked in an oven at 140° C. until a clear, hard film was obtained.

*Example 3.*—Two parts of n-butyl silicon hydroxide prepared by the hyrolysis of the reaction product obtained in a one-step process from n-butyl bromide and silicon tetrachloride in a molecular ratio of 1:1, was mixed with 10 parts of the 31% melamine-formaldehyde resin solution described in Example 1 and 50 parts of l-butanol. The mixture was heated to boiling under a column and 40 parts of 1-butanol along with some water were removed by distillation over a 1 hour period. A film of the resulting clear lacquer was poured onto a plate and heated in an oven at 140° C. until a hard, tough, clear coating was obtained.

*Example 4.*—One part of n-amyl silicon hydroxide described in Example 2 was mixed with 38 parts of a 50% solution of melamine-urea-formaldehyde resin. The latter solution was made by mixing 12.6 parts melamine, 6 parts urea, 57 parts 37% formaldehyde solution (pH=7)

and 100 parts of 1-butanol. The solution was refluxed together then some of the water distilled off. The solution was rendered slightly acid and the remainder of the water and some butanol were distilled off. Fresh butanol was added and the solution concentrated to 50% solids. The mixture of amyl silicon hydroxide and melamine-urea-formaldehyde resin solution was diluted with 50 parts of 1-butanol and heated under a column. Forty parts of butanol was removed by distillation. The clear lacquer was poured into a film on a glass plate and baked at 140° C. A clear, hard lacquer film was obtained.

*Example 5.*—Three parts of ethyl-n-butyl silicon hydroxide prepared by the hydrolysis of the reaction product obtained in a one-step process from ethyl bromide, n-butyl bromide and silicon tetrachloride in a molecular ratio of 0.5:0.75:1, was mixed with 6.6 parts of melamine-formaldehyde resin solution described in Example 1 and 50 parts of amyl alcohol. The solution was heated under a column and 40 parts of n-amyl alcohol removed by distillation over a period of 1 hour. The clear lacquer which was obtained was poured on a surface and baked in an oven at 140° C. until a clear, hard film was obtained. The solvent could be evaporated off this resin also under vacuum and further hardened to give a clear cast block.

*Example 6.*—Three parts of ethyl ethane orthosiliconate prepared by the action of 1 mole of ethyl magnesium bromide and 1 mole of ethyl orthosilicate was mixed with 10 parts of the 31% melamine-formaldehyde resin solution described in Example 1 and 30 parts of 1-butanol. The solution was distilled under a column and 20 parts of butanol were collected. A film of the lacquer was clear on evaporation of the solvent. On baking the film at 140° C. a clear, hard, glossy coating was secured. When 1 part of ethyl ethane orthosiliconate was blended with 10 parts of melamine-formaldehyde solution according to the procedure outlined above a clear lacquer which gave an excellent hard film was obtained.

*Example 7.*—2 parts of diethyl silicon hydroxide prepared by the hydrolysis of the reaction product obtained in a one-step process from ethyl bromide and silicon tetrachloride in the molecular ratio of 2:1, was mixed with 10 parts of acetic anhydride and heated under reflux for 4 hours. The excess acetic anhydride and acetic acid were distilled off under reduced pressure, leaving a liquid residue. To this residue was added 15 parts of the melamine-formaldehyde resin solution described in Example 1. The solution was heated at 100° C. for 20 minutes, then cooled and the clear lacquer poured onto a glass plate. The film was baked in an oven at 140° C. for 20 minutes. A clear, tough, water-white film was obtained.

Having thus set forth our invention, we claim:

1. Process of making a lacquer which comprises mixing a poly-aminotriazine-aldehyde alcohol resin the alcohol being selected from the group consisting of butyl and amyl alcohol in a solvent with an organo-silicon derivative consisting of the water hydrolysis product of the reaction product of an alkyl halide with silicon tetrachloride, the alkyl group having from 1 to 5 carbon atoms and the ratio of alkyl halide to silicon tetrachloride being 1:1 to 1.5:1 and the ratio of resin to silicon derivative being from 2:3 to 19:1.

2. Process of making resin comprising mixing a poly-aminotriazine-formaldehyde alcohol resin the alcohol being selected from the group consisting of butyl and amyl alcohol in a mutual solvent with an organo-silicon derivative consisting of the water hydrolysis product of the reaction product of an alkyl halide with silicon tetrachloride, the alkyl group having from 1 to 5 carbon atoms and the ratio of alkyl halide to silicon tetrachloride being 1:1 to 1.5:1 and the ratio of resin to silicon derivative being from 2:3 to 19:1.

3. Process of making a lacquer which comprises mixing a melamine-formaldehyde alcohol resin the alcohol being selected from the group consisting of butyl and amyl alcohol in a solvent with an organo-silicon derivative consisting of the water hydrolysis product of the reaction product of an alkyl halide with silicon tetrachloride, the alkyl group having from 1 to 5 carbon atoms and the ratio of alkyl halide to silicon tetrachloride being 1:1 to 1.5:1 and the ratio of resin to silicon derivative being from 2:3 to 19:1.

4. Process of making a lacquer which comprises mixing a melamine-formaldehyde alcohol resin the alcohol being selected from the group consisting of butyl and amyl alcohol in a solvent with an organo silicon derivative consisting of the water hydrolysis product of the reaction product of methyl halide with silicon tetrachloride, the ratio of methyl halide to silicon tetrachloride being from 1:1 to 1.5:1, and the ratio of resin to silicon derivative being from 2:3 to 19:1.

5. Process of making a lacquer which comprises mixing a melamine-formaldehyde alcohol resin the alcohol being selected from the group consisting of butyl and amyl alcohol in a solvent with an organo silicon derivative consisting of the water hydrolysis product of the reaction product of ethyl halide with silicon tetrachloride, the ratio of ethyl halide to silicon tetrachloride being from 1:1 to 1.5:1, and the ratio of resin to silicon derivative being from 2:3 to 19:1.

6. A composition for lacquers and hot molding comprising a solvent a polyaminotriazine-aldehyde-alcohol resin, the alcohol being selected from the group consisting of butyl and amyl alcohols, and an organo silicon derivative consisting of the water hydrolysis product of the reaction product of an alkyl halide with silicon tetrachloride, the alkyl group having from 1 to 5 carbon atoms and the ratio of alkyl halide to silicon tetrachloride being from 1:1 to 1.5:1, and the ratio of resin to silicon derivative being from 2:3 to 19:1.

7. A composition as set forth in claim 6 in which the resin is a melamine-formaldehyde alcohol resin.

8. An article of manufacture carrying a coating deposited from the lacquer of claim 6.

9. A heat and pressure molding of a filler impregnated with the composition of claim 6.

10. A composition for lacquers comprising a solvent, a poly-aminotriazine-formaldehyde alcohol resin the alcohol being selected from the group consisting of butyl and amyl alcohol, and an organo silicon derivative consisting of the water hydrolysis product of the reaction product of methyl halide with silicon tetrachloride, the ratio of methyl halide to silicon tetrachloride being from 1:1 to 1.5:1, and the ratio of resin to silicon derivative being from 2:3 to 19:1, the resin and silicon derivative being in solution in said solvent.

11. A composition for lacquers comprising a solution of a poly-aminotriazine-formaldehyde alcohol resin the alcohol being selected from the group consisting of butyl and amyl alcohol and an organo silicon derivative consisting of the water hydrolysis product of the reaction product of ethyl halide with silicon tetrachloride, the ratio of ethyl halide to silicon tetrachloride being from 1:1 to 1.5:1, and the ratio of resin to silicon derivative being from 2:3 to 19:1, the resin and silicon derivative being in solution in a solvent.

12. An article of manufacture carrying a coating deposited from the lacquer of claim 10.

13. An article of manufacture carrying a coating deposited from the lacquer of claim 11.

14. A composition as set forth in claim 10, in which the resin is melamine-formaldehyde alcohol resin.

15. A composition as set forth in claim 10, in which the resin is melamine-urea-formaldehyde alcohol resin.

16. A composition as set forth in claim 11, in which the resin is melamine-formaldehyde alcohol resin.

17. A composition as set forth in claim 11, in which the resin is melamine-urea-formaldehyde resin.

CHARLES A. MacKENZIE.
JOHN B. RUST.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,300,881 | Erickson et al. | Nov. 3, 1942 |

OTHER REFERENCES

Patnode et al., pp. 358–363, Mar. 1946, Jour. Am. Chem. Soc.

Di Girogio et al., p. 344, Feb. 1946, Jour. Am. Chem. Soc.

Powers, "Synthetic Resins and Rubbers," pp. 80 and 81, pub. 1943 by John Wiley and Sons, New York.

"Uformite," pages 45–52, pub. Apr. 1941 by Resinous Products and Chem. Co., Phila., Pa.